US United States Patent [19] [11] 4,021,503
Goulding et al. [45] May 3, 1977

[54] COATING COMPOSITION
[75] Inventors: Terence Goulding; Michael Leslie Orton, both of Runcorn, England
[73] Assignee: Imperial Chemical Industries Limited, London, England
[22] Filed: Sept. 17, 1974
[21] Appl. No.: 506,854
[30] Foreign Application Priority Data
Sept. 25, 1973 United Kingdom ............ 44824/73
[52] U.S. Cl. .......................... 260/831; 260/2 EA; 260/2 EC; 260/31.4 EP; 260/47 EA; 260/47 EC; 260/824 EP; 260/830 R; 260/830 P; 260/830 TW; 260/834; 427/422; 428/413
[51] Int. Cl.$^2$ ........................................ C08L 63/00
[58] Field of Search ......... 260/2 EC, 830 TW, 831, 260/47 EC

[56] References Cited
UNITED STATES PATENTS

| | | | |
|---|---|---|---|
| 3,123,582 | 3/1964 | Tryzna | 260/831 |
| 3,364,159 | 1/1968 | Hecker | 260/2 EC |
| 3,365,405 | 1/1968 | Fukui | 260/2 A |
| 3,397,155 | 8/1968 | Naro | 260/79 |
| 3,642,698 | 2/1972 | Green | 260/831 |
| 3,655,816 | 4/1972 | Lorenz | 260/831 |

FOREIGN PATENTS OR APPLICATIONS

| | | | |
|---|---|---|---|
| 1,057,331 | 5/1959 | Germany | 260/831 |
| 1,283,857 | 11/1968 | Germany | |
| 1,094,547 | 12/1967 | United Kingdom | |
| 1,026,695 | 4/1966 | United Kingdom | 260/831 |
| 1,257,789 | 12/1971 | United Kingdom | |
| 323,417 | 12/1971 | U.S.S.R. | |

*Primary Examiner*—Paul Lieberman
*Attorney, Agent, or Firm*—Cushman, Darby & Cushman

[57] ABSTRACT

A liquid coating composition comprising a liquid diluent, the precursors of a cross-linked epoxy resin, and a metal phosphate comprising phosphate ions and the ions of at least one metal, the cross-linked epoxy resin precursors comprising at least one polyether having at least two epoxy groups per molecule and at least one cross-linking agent reactive with the polyether, the cross-linking agent being present in an amount of from 5% to 40% by weight of the polyether and the amount of cross-linked epoxy resin precursors being in the range 1% to 90% by weight of the total weight of the cross-linked epoxy resin precursors plus metal ions of the metal phosphate.

11 Claims, No Drawings

COATING COMPOSITION

This invention relates to a coating composition and to a substrate coated with said composition, and especially to a coated film material useful in packaging applications.

Coated film is known comprising a base layer which is suitably an organic polymer, a coating or layer thereon of a metal phosphate, and upon the metal phosphate a coating or layer of an organic polymer.

The coated film may be produced by applying to a base film a liquid coating composition comprising a metal phosphate or a precursor therefor in a diluent, curing the composition to produce a non-tacky adherent coating of metal phosphate, for example by heating to remove liquid material and produce a metal phosphate coating, and applying a top coating or layer of an organic polymer to the metal phosphate coating.

The coated films are useful in packaging applications and in particular in food packaging applications by reason of the decreased permeability of the coated films to gases, and in particular to oxygen, brought about by the metal phosphate coating. The top coat of organic polymer, although not essential for the purposes of the present invention, is useful especially where the organic polymer is heat-sealable as it thereby increases the utility of the coated film in food-packaging applications.

We have found that during manufacture of the coated film curing of the metal phosphate coating to a non-tacky adherent state may in some cases require curing conditions which are more severe than are desirable. For example, the curing may have to be effected for a period of time which is longer than is desirable and/or at a temperature which is greater than is desirable. However, we have now found that where the coating composition for use in the production of metal phosphate coatings contains the precursors of cross-linked epoxy resin in addition to the metal phosphate or precursors thereof then curing of the coating to a non-tacky, adherent state may be effected more readily than is the case where the coating composition does not contain the precursors of an epoxy resin.

The present invention provides a liquid coating composition which is preferably a solution and which comprises a liquid diluent, the precursors of a cross-linked epoxy resin (as hereinafter defined), and a metal phosphate comprising phosphate ions and the ions of at least one metal.

By precursors of a cross-linked epoxy resin we mean at least one polyether comprising epoxy groups and at least one cross-linking agent reactive with said polyether. The cross-linking agent may, for example, be reactive with epoxy groups or with hydroxyl groups in the polyether or with both epoxy groups and hydroxyl groups.

The liquid composition may be applied to the surface of a substrate, for example, by spraying or by solvent or latex coating and the composition may be cured, that is, it may be treated to remove volatile components of the composition to form a non-tacky and transparent layer which adheres to the substrate. Suitably, curing is effected by heating, e.g. by radiant heating or by heating in a stream of gas at a suitable temperature, and we have found that heating at a temperature in the range of 70° to 130° C for 5 to 60 seconds is generally sufficient to effect the desired degree of cure although other temperatures and times may be used. In general, the shorter is the cure time which is required the higher is the curing temperature which must be used. The cured layer formed from the composition is believed to comprise a layer of metal phosphate and cross-linked epoxy resin and in a further embodiment of the present invention there is provided a coated substrate comprising a substrate and on at least part of the surface thereof a coating which comprises a mixture of a metal phosphate and a cross-linked epoxy resin.

We have found that the presence of the precursors of a cross-linked epoxy resin in the coating composition enables curing to a non-tacky, adherent coating to be effected at a lower temperature and/or for a shorter period of time than is the case where the coating composition does not include cross-linked epoxy resin precursors. For example, where the composition comprises liquid diluent, metal ions and phosphate ions in the absence of cross-linked epoxy resin precursors curing at a temperature in the range 120° to 150° C for a time of about 75 seconds is generally required to produce a non-tacky, adherent coating although times of up to 300 seconds or greater may be required.

The composition of the present invention is particularly useful for coating a substrate which is to be used in a food-packing application as the cured coating reduces the gas permeability of the substrate, and especially the oxygen permeability. Where the substrate is to be used in food-packing applications, it is particularly desirable that curing of the metal phosphate coating be effected to an extent such that the coating formed from the composition is able to withstand steam sterilisation. Suitable curing conditions may be found by means of simple experiment.

The substrate is suitably a film having a thickness, for example, in the range 5 to 100 microns, or a foil having a thickness, for example, in the range 100 to 500 microns, although substrates having thicknesses outside these ranges may be used.

The substrate, hereinafter referred to as the base film, is suitably an organic polymeric material and may, for example, be selected from poly(vinyl chloride), polypropylene, polyethylene, copolymers of ethylene and/or propylene with other polymerizable monomers, polystyrene, styrene-acrylonitrile copolymer, polyester e.g. poly(ethylene terephthalate), cellulose acetate, cellulose, poly(vinyl alcohol), polyamide or polycarbonate.

The cured layer formed from the coating composition of the present invention may suitably have a thickness in the range 0.01 to 3.0 microns, although it may have a thickness outside the range. A preferred thickness is in the range 0.05 to 2.0 microns.

The base film may be coated on one or both faces by a composition of the present invention and, if desired, the cured coating or coatings in the thus formed laminate may carry a coating of an organic polymer which may, for example, by the same as or different from the material used as the base layer. This top coating of organic polymer may typically be 0.5 to 30 microns thick and it is preferably heat-sealable in order to facilitate use of the laminate in food-packaging applications and in other applications where sealed containers are required. Suitably, the top coating is poly(vinylidene chloride) or a vinyl chloride copolymer.

Interposed between the layers in the laminate there may be anchor coatings to promote adhesion. Alternatively or in addition, the base layer may be treated, for examples, by flame treatment, by corona discharge, or by an oxidising agent, in order to promote adhesion. Suitable organic anchor coatings are polyurethane, acrylic copolymers, epoxy resins or polyethylene imines. Suitable inorganic anchor coatings are inorganic esters, for example, tetraalkyl titanates. Preferably, the laminate consists of a base layer, a cured metal phosphate-epoxy resin coating, and an organic polymer layer on the cured coating.

The coating composition of the present invention includes a metal phosphate which comprises the ions of at least one metal and which also includes phosphate ions.

For the purpose of this invention metal phosphates include those of metals of atomic number 12, to 14, 20 to 32, 39 to 50, 56 to 80, and 90 to 92. Also the term 'phosphate' is here meant to include ortho-, meta- and pyro-phosphates, phosphinates and phosphonates, but it is preferred that in the coating composition the phosphate ions are, or at least include, orthophosphate ions.

It is also preferred that the coating composition is a solution and in order to aid solubility of the metal phosphate in the coating composition it is preferred that the coating composition contains the anions of at least one acid in addition to the phosphate ions.

The anions other than the phosphate anions may be, for example, anions of one or more mineral acids, for example, halide, sulphate, nitrate or perchlorate anions, and/or anions of one or more organic acids, for example, acetate, benzoate, oxalate, propionate or formate. Preferably the anion is an anion of a volatile acid which may readily be removed during curing of the coating composition.

The metal phosphate part of the composition may be made up by reacting in a diluent at least one metal compound with an oxyacid of phosphorus or a compound capable of forming such an oxyacid and which is thus capable of acting as a source of phosphate ions. Where the phosphate ions are orthophosphate then orthophosphoric acid may be used. The metal compound may act as the source of acidic anions other than phosphate ions where it is desired that the composition contain such other acid anions. Alternatively, or in addition, these other acid anions may be provided by addition of the acid of the anion to the diluent.

A wide range of metal compounds may be used. Simple inorganic salts including oxides and hydroxides are suitable, for example, halides, sulphates, carbonates, nitrates, phosphates, perchlorates, and cyanates. Alternatively, co-ordination complexes of the metal may be used, for example, complexes having ligands derived from acetyl acetone, ethylene dithiol, ethanolamine, carbon monoxide, or phosphine.

Also suitable are salts of organic acids, for example, acetates, benzoates, oxalates, propionates or formates. Alkoxides are also useful.

Where the metal compound is itself a phosphate and so provides at least some of the phosphate anions then if the coating composition is to contain other anions an additional source of the other anion is required, for example, the acid of the other anion, e.g. hydrochloric or nitric acid.

The coating composition may be prepared over a wide range of temperatures, for example from 50° to 150° C, but it is generally preferred to mix the components at temperatures below about 60° C. The preparation may, if desired, be carried out at pressures above normal atmospheric pressure, but it is found that generally, if the temperature is kept below the normal boiling point of the diluent such excess pressure is not needed.

Metal ions which may suitably form part of the coating composition include ions of aluminium, iron, chromium, titanium or vanadium. If desired, a mixture of the ions of two or more metals may be used and it is preferred that in the composition the metal ions are a mixture of iron and titanium ions, preferably in a proportion by weight of iron:titanium of 2:1 to 10:1, on account of the low permeability of the coating produced from such a coating composition.

Where the coating composition contains an aluminum phosphate the phosphate may be a complex halogen-containing aluminium phosphate containing at least one chemically-bound molecule R-OH, where R is H or an organic group, as described in our UK patent specifications No. 1322722 and 1322724.

The liquid diluent in the coating composition may be selected from water or a wide range of organic diluents selected from water or a wide range of organic diluents which preferably dissolve the components of the composition. The composition may contain a mixture of diluents. The organic diluent, when used, is preferably selected from alcohols, esters, ketones, aldehydes, nitro-compounds and ethers, especially monohydric alcohols of the structure ROH, esters of the structure $R^1COOR^2$, ethers of the structure $R^1OR^2$, ketones of the structure $R^1COR^2$, nitro-compounds of the structure $R^1NO_2$ and ethers of the structure $OR^3$, where R, $R^1$ and $R^2$, which may be the same or different, are alkyl groups or substituted alkyl groups containing from 1 to 10 carbon atoms each, and $R^3$ is a divalent alkyl group having from 4 to 7 carbon atoms one of which may be replaced by an oxygen atom. Mixtures of one or more diluents may be used.

Aliphatic alcohols containing 1 to 10 carbon atoms are particularly convenient, especially lower molecular weight alcohols containing 1 to 4 carbon atoms, for example methanol, ethanol, n- or iso-propanol and substituted alcohols especially methoxy- or ethoxyethanol. Suitable ketones include acetone and methyl ethyl ketone. Suitable esters are ethyl acetate or carbonate. Acetyl acetone may be used. Tetrahydrofuran is the most preferred ether to use, though dioxan may also be used. Aromatic hydroxy compounds can be used, but solubility is low in such materials.

In the coating compositions of the present invention it is preferred that the metal and phosphate ions are present in proportions such that the atomic ratio of the total metal:phosphorus is in the range 1:0.1 to 1:2.9, and more preferably is in the range 1:0.5 to 1:2.

Where the coating composition contains acidic anions other than phosphate anions then it is preferred that the atomic ratio of total metal:total additional anion other that phosphate ion be in the range 1:0.3 to 1:4.

The composition of the present invention preferably comprises 0.2% to 10% by weight of the metal ions, more preferably 0.5% to 6%, although proportions outside these ranges may be used if desired.

The polyether containing epoxide groups in the epoxy resin precursors may be made in known manner by condensing an organic epoxide with a polyhydroxy compound, preferably with a dihydroxy compound. The organic epoxide may be, for example, ethylene oxide or a substituted derivative of ethylene oxide. Suitable derivatives include alkyl derivatives, e.g. propylene oxide, halogen derivatives, e.g. epichlorohydrin and epibromohydrin, and aryl derivatives.

The polyhydroxy compound may be aliphatic, for example, ethylene glycol, propylene glycol, pentaerythritol, glycerol or diethylene glycol, or it may be aromatic, for example, a bisphenol, e.g. bisphenol-A, or, for example, trihydroxy benzene, resorcinol, or 1:5-dihydroxy naphthalene. The polyether which is used may be modified by reaction with a silicone.

The molecular weight of the polyether containing epoxy groups may suitably be in the range 300 to 4000 although higher molecular weights may be used.

The cross-linking agent in the epoxy resin precursors may be, for example, an organic acid or anhydride, a mono- or polyamide, or a resin, for example a phenolic resin, e.g. a phenol-formaldehyde resin, or a melamine, urea or sulphonamide resin, or an amine.

The amount of cross-linking agent used as a proportion of the polyether in the epoxy resin precursors will generally be 5% to 40% by weight of the polyether but a suitable amount will readily be chosen by the man skilled in the art. Proportions of cross-linking agent above and below this range may be used.

Where the cross-linking agent is an amine the amine may be primary, secondary or tertiary. Polyfunctional amines may be used, for example, ethylene diamine, diethylene triamine and triethylene tetramine. Suitable organic acids include succinic acid, maleic acid and anhydride, and phthalic acid and anhydride.

The polyether may be a precondensate with a cross-linking agent, e.g. an amine.

In the composition of the present invention the proportion of epoxy resin precursors may, for example, be in the range 1% to 90% of epoxy resin precursors by weight of the precursors plus metal but is preferably in the range 3.5% to 75%, and more preferably 18% to 45%.

Additional components such as pigments, polymers, colourants, surfactants or sources of other ions and other additives may be includes in the coating composition of the present invention.

The invention is illustrated by the following Examples.

EXAMPLE 1

A metal phosphate solution was prepared by dissolving 8.7 g of anhydrous ferric chloride, 4.0g of titanium tetrachloride and 15g of an 88% by weight aqueous solution of orthophosphoric acid in 173.2g of ethyl cellosolve.

An epoxy resin solution was prepared by dissolving 30g 'Epikote' 1001 resin (Shell Chemicals Limited) ('Epikote' 1001 is an epichlorohydrin-diphenylol propane condensate of approximately 900 molecular weight having an epoxide equivalent weight of 450 to 500 and a hydroxide equivalent weight of 345), and 15 g of phenol formaldehyde resin (as a 60% by weight solution) in 93g of ethyl cellosolve.

A coating solution was prepared by mixing 500g of the metal phosphate solution, 0.78g of epoxy resin solution, and 50g of ethyl cellosolve.

A 3-inch × 3-inch × 36$\mu$ thick sample of poly(ethylene terephthalate) film ('Melinex' O, Imperial Chemical Industries Limited) was coated on both sides with a metal phosphate coating using the following procedure. The sample was dipped into the coating solution (the dipping operation being carried out at less than 5% relative humidity), the sample was slowly withdrawn from the coating solution, and the coating was cured by heating both sides of the film for 10 seconds in a stream of air at a temperature of 110° to 130° C. The resultant coatings on the film were transparent, non-tacky and adherent and appeared homogeneous to the unaided eye. The coatings were approximately 0.1$\mu$ in thickness and contained approximately 5% by weight of epoxy resin.

The oxygen permeability of the coated film was $1.6 \times 10^{-19}$ moles meter Newton$^{-1}$ sec$^{-1}$. By way of comparison an uncoated 36$\mu$ thick 'Melinex' film had an oxygen permeability of $9 \times 10^{-18}$ moles meter Newton$^{-1}$ sec$^{-1}$.

EXAMPLE 2

The procedure of Example 1 was followed to produce a coating solution except that the solution was prepared by mixing 50g of the metal phosphate solution, 1.6g of the epoxy resin solution and 50g of ethyl cellosolve.

The coating procedure of Example 1 was followed and the coating was cured by heating at a temperature of 110° and 130° C for 10 seconds to produce a poly(ethylene terephthalate) film coated on both sides with a transparent, non-tacky and adherent 0.1$\mu$ thick metal phosphate coating which appeared homogeneous to the unaided eye. The coating contained approximately 10% by weight of epoxy resin. The oxygen permeability of the coated film was $2.6 \times 10^{-19}$ moles meter Newton$^{-1}$ sec$^{-1}$.

By way of comparison the above procedure was repeated except that the epoxy resin solution was omitted from the coating solution. In this case the coated film required to be heated at a temperature of 130° C for 75 seconds in order to produce a transparent, non-tacky adherent coating on the poly(ethylene terephthalate) film. The oxygen permeability of this film was $1.6 \times 10^{-19}$ moles meter Newton$^{-1}$ sec$^{-1}$.

EXAMPLE 3

A metal phosphate solution was prepared by dissolving 9.9g of anhydrous aluminium chloride and 14.9g of an 88% by weight aqueous orthophosphoric acid solution in 175.2g of ethyl cellosolve.

An epoxy resin solution was prepared following the procedure described in Example 1 and a coating solution was prepared by dissolving 50g of metal phosphate solution and 1.6g of epoxy resin solution in 50g of ethyl cellosolve.

A 3-inch × 3-inch × 36$\mu$ thick film of poly(ethylene terephthalate) was coated with coating solution and the coating was cured following the procedure described in Example 1 to produce a film coated on both sides with 0.1$\mu$ thick transparent, non-tacky, adherent coating. The oxygen permeability of the coated film was $2.6 \times 10^{-18}$ moles meter Newton$^{-1}$ sec$^{-1}$.

EXAMPLE 4

A metal phosphate solution was prepared as in Example 1 and an epoxy resin solution was prepared by dissolving 100g of 'Epikote' 1001 and 50g of EDA adduct 870 (Anchor Chemical Company) in 200g of methyl ethyl ketone. (EDA) adduct 870 is the reaction product of 'Epikote' 1001 and excess ethylene diamine and contains amine and hydroxyl functionality and can be used to cross-link epoxy resins).

A coating solution was prepared by mixing 100g of the metal phosphate solution and 2.15g of the epoxy resin solution and a 3-inch × 36μ film of poly(ethylene terephthalate) was coated and cured by heating for 10 seconds at a temperature of 110° to 130° C following the procedure described in Example 1.

The resultant coatings, which were approximately 0.4μ in thickness and contained approximately 10% by weight of epoxy resin, were transparent, non-tacky and adherent and appeared homogeneous to the unaided eye.

The oxygen permeability of the coated film was $3.3 \times 10^{-19}$ moles meter Newton$^{-1}$ sec$^{-1}$.

EXAMPLE 5

A silicone-modified epoxy resin was prepared by reacting 100 g of 'Epikote ' 1001, 20g of silicone (Z-6188 Dow Corning company) and 0.1g of p-toluene sulphonic acid at a temperature of 220° to 225° C for 20 minutes. (Silicone Z-6188 is a methoxy siloxane which reacts with the OH groups of the epoxy resin producing a silicone-modified epoxy resin.)

An epoxy resin solution was prepared by dissolving 12g of the silicone-modified 'Epikote'1001 and 5g of EDA adduct 870 in 50g of methyl ethyl ketone. Thereafter, a coating solution was prepared by mixing 100g of metal phosphate solution prepared as described in Example 1, 3.6g of epoxy resin solution and 100g of methyl ethyl ketone and the coating solution was used to coat a poly(ethylene terephthalate) film following the procedure described in Example 1.

The coating was cured by heating at 110° to 130° C for 10 seconds per side to produce a 0.1μ thick, non-tacky, adherent, transparent coating which contained approximately 10% by weight of epoxy resin.

The oxygen permeability of the coated film was $1 \times 10^{-19}$ moles meter Newton$^{-1}$ sec$^{-1}$.

EXAMPLE 6

The coating and curing procedure of Example 1 was followed except that the metal phosphate solution used in the production of the coating solution was prepared by dissolving 11.6g of anhydrous ferric chloride and 14.4g of an 88% by weight aqueous solution of orthophosphoric acid in 174g of ethyl cellosolve.

The coatings on the resultant coated film were non-tacky, adherent, and transparent and contained approximately 5% by weight epoxy resin.

The oxygen permeability of the coated film was $1.5 \times 10^{-18}$ moles meter Newton$^{-1}$ sec$^{-1}$.

EXAMPLE 7

A metal phosphate solution was prepared following the procedure described in Example 1 and an epoxy resin solution was prepared by dissolving 48g of 'Epikote' 1007, 36g of 'Epikote' OL-35-B40 (Shell Chemicals Limited) and 57g of a phenol - formaldehyde resin (as a 60% by weight solution in 200g of methyl ethyl ketone. ('Epikote' 1007 is an epichlorohydrin-diphenylol propane condensate of molecular weight approximately 2900, an epoxide equivalent weight of 1700 to 2000 and a hydroxide equivalent weight of 280. 'Epikote' OL-55-B40 is a solution of a high-molecular weight epichlorohydrin-diphenylol propane condensate).

A coating solution was prepared by mixing 100g of metal phosphate solution, 10g of ethyl cellosolve and 3.2g of epoxy resin solution and a poly(ethylene terephthalate) film was coated with the solution and cured following the procedure of Example 1. The resultant 0.2μ thick coatings contained approximately 10% by weight of epoxy resin. The coatings were non-tacky, adherent and transparent.

The oxygen permeability of the coated film was $1 \times 10^{-19}$ moles meter Newton$^{-1}$ sec$^{-1}$.

What we claim is:

1. A liquid coating composition comprising a liquid diluent, the precursors of a cross-linked epoxy resin, and a metal phosphate comprising phosphate ions and the ions of at least one metal of atomic number 12 to 14, 20 to 32, 39 to 50, 56 to 80, or 90 to 92, the cross-linked epoxy resin precursors comprising at least one polyether having at least two epoxy groups per molecule and at least one cross-linking agent reactive with the polyether, the cross-linking agent being present in an amount of from 5% to 40% by weight of the polyether and the amount of cross-linked epoxy resin precursors being in the range 1% to 90% by weight of the total weight of the cross-linked epoxy resin precursors plus metal ions of the metal phosphate.

2. A coating composition as claimed in claim 1 which is a solution.

3. A coating composition as claimed in claim 1 in which the phosphate ions are or include orthophosphate ions.

4. A coating composition as claimed in claim 1 which contains anions of at least one acid in addition to the phosphate ions.

5. A coating composition as claimed in claim 1 in which the metal is iron or a mixture of iron and titanium.

6. A coating composition as claimed in claim 1 in which the atomic ratio of the total metal: phosphorus is in the range 1:0.1 to 1:2.9.

7. A coating composition as claimed in claim 6 in which the atomic ratio is in the range 1:0.5 to 1:2.

8. A coating composition as claimed in claim 7 in which the atomic ratio of total metal: additional anion is in the range 1:0.3 to 1:4.

9. A coating composition as claimed in claim 1 in which the concentration of metal is in the range 0.2 to 10% by weight.

10. A coating composition as claimed in claim 5 in which the concentration of epoxy resin precursors is in the range 3% to 75% by weight of the total of metal ions plus epoxy resin precursors.

11. A coating composition as claimed in claim 1 wherein the curing agent is an organic acid or anhydride, a mono- or poly-amide, a phenolic, melamine, urea or sulphonamide resin or an amine.

* * * * *